(12) United States Patent
Zhang

(10) Patent No.: US 10,404,830 B2
(45) Date of Patent: Sep. 3, 2019

(54) SERVICE PROCESSING METHOD AND APPARATUS, AND SERVICE SERVER

(71) Applicant: ALIBABA GROUP HOLDING LIMITED, Grand Cayman (KY)

(72) Inventor: Lei Zhang, Hangzhou (CN)

(73) Assignee: ALIBABA GROUP HOLDING LIMITED, Grand Cayman (KY)

(*) Notice: Subject to any disclaimer, the term of this patent is extended or adjusted under 35 U.S.C. 154(b) by 33 days.

(21) Appl. No.: 15/528,727

(22) PCT Filed: Dec. 3, 2015

(86) PCT No.: PCT/CN2015/096242
§ 371 (c)(1),
(2) Date: May 22, 2017

(87) PCT Pub. No.: WO2016/091111
PCT Pub. Date: Jun. 16, 2016

(65) Prior Publication Data
US 2017/0279925 A1    Sep. 28, 2017

(30) Foreign Application Priority Data
Dec. 9, 2014  (CN) .......................... 2014 1 0751376

(51) Int. Cl.
*G06Q 20/32* (2012.01)
*G06Q 20/38* (2012.01)
(Continued)

(52) U.S. Cl.
CPC .......... *H04L 67/327* (2013.01); *G06Q 20/32* (2013.01); *G06Q 20/3224* (2013.01);
(Continued)

(58) Field of Classification Search
None
See application file for complete search history.

(56) References Cited

U.S. PATENT DOCUMENTS 6,587,835 B1  7/2003  Treyz et al.
7,379,921 B1  5/2008  Kiliccote
(Continued)

FOREIGN PATENT DOCUMENTS

CN  102930429 A  2/2013
CN  103366272 A  10/2013
(Continued)

OTHER PUBLICATIONS

Korean Office Action for Application No. KR 10-2017-7018689, dated Mar. 27, 2018, 10 pages (English Translation).
(Continued)

*Primary Examiner* — Younes Naji

(57) ABSTRACT

Disclosed are a service processing method and apparatus, and a service server. The method comprises: receiving an operation request, sent by a first client device, for requesting to perform a service operation; generating a target service random code for a first account according to the operation request; receiving an operation response that is sent by a second client device according to the target service random code; identifying the first account by using the operation response; and sending account information of the first account to the second client device, so that the second client device completes the service operation based on the account information. In embodiments of the present application, a service processing process is completed based on a service random code that is generated by a service server in real time; therefore, security is relatively high, and interference from the external natural environment is avoided, and reliability of service processing can be effectively improved.

12 Claims, 5 Drawing Sheets

(51) Int. Cl.
*H04L 29/06* (2006.01)
*H04L 29/08* (2006.01)
*H04W 12/06* (2009.01)

(52) U.S. Cl.
CPC .......... *G06Q 20/385* (2013.01); *H04L 29/06* (2013.01); *H04L 63/0876* (2013.01); *H04L 63/102* (2013.01); *H04L 63/107* (2013.01); *H04L 67/18* (2013.01); *H04L 67/306* (2013.01); *H04W 12/06* (2013.01)

(56) References Cited

U.S. PATENT DOCUMENTS

| | | | |
|---|---|---|---|
| 7,917,444 | B1 | 3/2011 | Bursch |
| 8,249,967 | B2 | 8/2012 | Park et al. |
| 9,524,502 | B2 | 12/2016 | Rajan et al. |
| 9,536,238 | B2 | 1/2017 | Garrett et al. |
| 2002/0032650 | A1 | 3/2002 | Hauser et al. |
| 2007/0267491 | A1 | 11/2007 | Muto et al. |
| 2008/0133351 | A1 | 6/2008 | White et al. |
| 2009/0070171 | A1 | 3/2009 | Patterson |
| 2009/0254479 | A1 | 10/2009 | Pharris |
| 2009/0276347 | A1 | 11/2009 | Kargman |
| 2010/0138344 | A1 | 6/2010 | Wong et al. |
| 2011/0137804 | A1 | 6/2011 | Peterson |
| 2011/0145152 | A1 | 6/2011 | McCown |
| 2011/0251892 | A1* | 10/2011 | Laracey ............. G06Q 30/0253 705/14.51 |
| 2012/0185398 | A1 | 7/2012 | Weis et al. |
| 2012/0253982 | A1 | 10/2012 | Wright |
| 2012/0284130 | A1 | 11/2012 | Lewis et al. |
| 2012/0295580 | A1 | 11/2012 | Corner |
| 2013/0159186 | A1 | 6/2013 | Brudnicki et al. |
| 2013/0159445 | A1* | 6/2013 | Zonka ................ G06Q 10/1093 709/206 |
| 2013/0282502 | A1 | 10/2013 | Jooste |
| 2014/0095385 | A1 | 4/2014 | Ainslie et al. |
| 2014/0279504 | A1 | 9/2014 | Cook et al. |
| 2014/0337138 | A1* | 11/2014 | Chitalia ............... G06Q 20/322 705/14.64 |
| 2015/0012436 | A1* | 1/2015 | Poole .................. G06Q 20/204 705/44 |
| 2015/0295901 | A1* | 10/2015 | Woodward ........... H04W 12/06 713/168 |
| 2016/0063479 | A1 | 3/2016 | Duan |

FOREIGN PATENT DOCUMENTS

| | | |
|---|---|---|
| CN | 103400265 A | 11/2013 |
| CN | 103839161 A | 6/2014 |
| JP | 2007-310431 A | 11/2007 |
| JP | 2010-262611 A | 11/2010 |
| JP | 2014-016745 A | 1/2014 |
| KR | 20140019418 A | 2/2014 |
| KR | 10-2014-0033364 A | 3/2014 |
| KR | 20140140079 A | 12/2014 |
| WO | 2014/190542 A1 | 12/2014 |

OTHER PUBLICATIONS

Final Office Action dated Aug. 28, 2018, issued in related Japanese Application No. 2017-530659 (3 pages).
Office Action for Japanese Application No. 2017-530659, dated May 22, 2018, 3 pages.
Search Report for European Application No. 15867391.3, dated Jun. 5, 2018, 11 pages.
International Search Report and Written Opinion for Application No. PCT/CN2015/096242, dated Feb. 29, 2016, 10 pages.
Chinese First Office Action dated May 23, 2018, issued in Chinese Application No. 201410751376.6 (11 pages).
PCT International Preliminary Report on Patentability dated Jun. 22, 2017, issued in International Application No. PCT/CN2015/096242 (8 pages).
Notice to Submit Response dated Mar. 6, 2019, issued in related Korean Application No. 10-2018-7036465 (12 pages), with English machine translation.
Decision of a Patent Grant issued in related Japanese Application No. 2017-530659, dated Dec. 11, 2018, 1 page.

* cited by examiner

SERVICE PROCESSING METHOD AND APPARATUS, AND SERVICE SERVER

CROSS-REFERENCE TO RELATED APPLICATIONS

This application is a national phase application of International Application No. PCT/CN2015/096242, filed on Dec. 3, 2015, which claims priority to and benefits of Chinese Patent Application No. 201410751376.6 filed on Dec. 9, 2014. The contents of the above-referenced applications are incorporated herein by reference in their entirety.

TECHNICAL FIELD

The present application relates to the technical field of network communications, and in particular, to a service processing method and apparatus, and a service server.

BACKGROUND ART

With the development of intelligent terminals and popularization of network applications, a user may implement various service operations such as social instant messaging services and shopping payment services by means of various application clients installed on a terminal. During implementation of the services, various service implementation means may be provided, for example, implementing a service by scanning a QR code, implementing a service by means of acoustic waves, and the like, to guarantee the security of the service operations.

However, the existing service processing means still have various problems, for example, the QR code has link security risks, and the acoustic wave recognition is relatively slow and is vulnerable to external sound interference and the like; therefore, the service processing has low reliability.

SUMMARY OF THE INVENTION

The present application provides a service processing method and apparatus, and a service server, to solve the problem of low reliability of existing service processing.

According to a first aspect of the embodiments of the present application, a service processing method is provided, where the method is applied to a service server, and the method includes:

receiving an operation request, sent by a first client device, for requesting to perform a service operation, the first client device being a device with which a first user logs onto the service server based on a first account;

generating a target service random code for the first account according to the operation request;

receiving an operation response that is sent by a second client device according to the target service random code, the second client device being a device with which a second user logs onto the service server based on a second account;

identifying the first account by using the operation response; and sending account information of the first account to the second client device, so that the second client device completes the service operation based on the account information.

According to a second aspect of the embodiments of the present application, a service processing apparatus is provided, where the apparatus is applied to a service server, and the apparatus includes:

a receiving unit configured to receive an operation request, sent by a first client device, for requesting to perform a service operation, the first client device being a device with which a first user logs onto the service server based on a first account;

a generation unit configured to generate a target service random code for the first account according to the operation request;

where the receiving unit is further configured to receive an operation response that is sent by a second client device according to the target service random code, the second client device being a device with which a second user logs onto the service server based on a second account;

an identification unit configured to identify the first account by using the operation response; and a sending unit configured to send account information of the first account to the second client device, so that the second client device completes the service operation based on the account information.

According to a third aspect of the embodiments of the present application, a service server is provided, including:

a processor; and a memory configured to store instructions executable by the processor;

where the processor is configured to:

receive an operation request, sent by a first client device, for requesting to perform a service operation, the first client device being a device with which a first user logs onto the service server based on a first account;

generate a target service random code for the first account according to the operation request;

receive an operation response that is sent by a second client device according to the target service random code, the second client device being a device with which a second user logs onto the service server based on a second account;

identify the first account by using the operation response; and send account information of the first account to the second client device, so that the second client device completes the service operation based on the account information.

By using the embodiments of the present application, when a first user who logs onto a service server through a first account needs to perform a service operation with a second user who logs onto the service server through a second account, the service server may generate a target service random code for the first account that initiates the service operation, so that the first user and the second user complete a specific service operation by using the target service random code. In the embodiments of the present application, a service processing process is completed based on a service random code generated in real time; therefore, security is relatively high, interference from the external natural environment is avoided, and reliability of service processing can be effectively improved.

It should be noted that, the above general description and the following detailed description are merely exemplary and illustrative, and cannot limit the present application.

BRIEF DESCRIPTION OF THE DRAWINGS

The accompanying drawings herein, which are incorporated in the specification and constitute a part of the specification, show embodiments conforming to the present application, and are used for illustrating the principle of the present application together with the specification.

DETAILED DESCRIPTION

Exemplary embodiments will be described in detail herein, and examples thereof are shown in the accompanying drawings. When the following description involves the accompanying drawings, unless otherwise specified, same numbers in different drawings represent same or similar elements. Implementations described in the following exemplary embodiments do not represent all implementations consistent with the present application. On the contrary, they are merely examples of the apparatus and method consistent with some aspects of the present application as described in detail in the appended claims.

Terms used in the present application are merely intended to describe specific embodiments rather than limit the present application. The wordings "one", "said" and "the" of the singular form used in the present application and the appended claims are also intended to include the plural form, unless other meanings are expressly indicated in the context. It should also be understood that, the term "and/or" used herein refers to and includes any or all possible combinations of one or more associated items listed.

It should be understood that, although terms such as "first", "second" and "third" may be used in the present application to describe various information, the information should not be limited to these terms. These terms are merely used to distinguish information of the same type from each other. For example, without departing from the scope of the present application, first information may also be referred to as second information, and similarly, second information may also be referred to as first information. Depending on the context, for example, the term "if" used herein may be interpreted as "when" or "while" or "in response to the determining".

Figure 1:
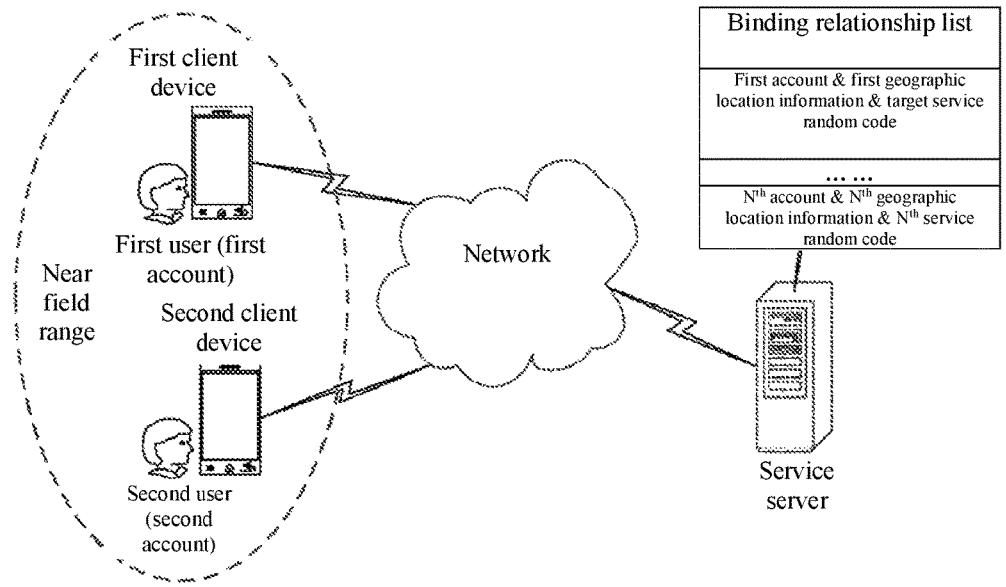
FIG. 1 is a schematic diagram of an application scenario for implementing service processing according to an embodiment of the present application.

Referring to FIG. 1, FIG. 1 is a schematic diagram of an application scenario for implementing service processing according to an embodiment of the present application:

In FIG. 1, a service server may be set by a third-party service platform operator, and various service applications may be provided for registered users through the service server, to implement service operations between different users. As shown in FIG. 1, a first user may register a first account with the service server in advance, and a second user may register a second account with the service server in advance. In the embodiments of the present application, a client device may specifically refer to various devices having a network connection function, for example, a mobile phone, a tablet computer, and the like; of course, the embodiments of the present application do not exclude applications on a Personal Computer (PC).

In the application scenario shown in FIG. 1, when the first user needs to perform a service operation with the second user, the first user may log onto the service server based on the first account by using a first client device, and the second user may log onto the service server based on the second account by using a second client device. Then, as an initiator of the service operation, the first client device sends an operation request to the service server, so that the service server generates a target service random code for the first account. After the second client device sends an operation response according to the target service random code, if the service server identifies the first account by using the operation response, account information of the first account may be sent to the second client device, so that the second user completes, on the second client device, the service operation with the first user based on the account information of the first account. The service server can generate a target service random code in real time for the first account that initiates the service operation, so that the first user and the second user can complete a specific service operation by using the target service random code. Therefore, security of the whole service processing process is relatively high, interference from the external natural environment is avoided, and reliability of service processing can be effectively improved. The embodiments of the present application are described in detail below with reference to FIG. 1.

Figure 2:
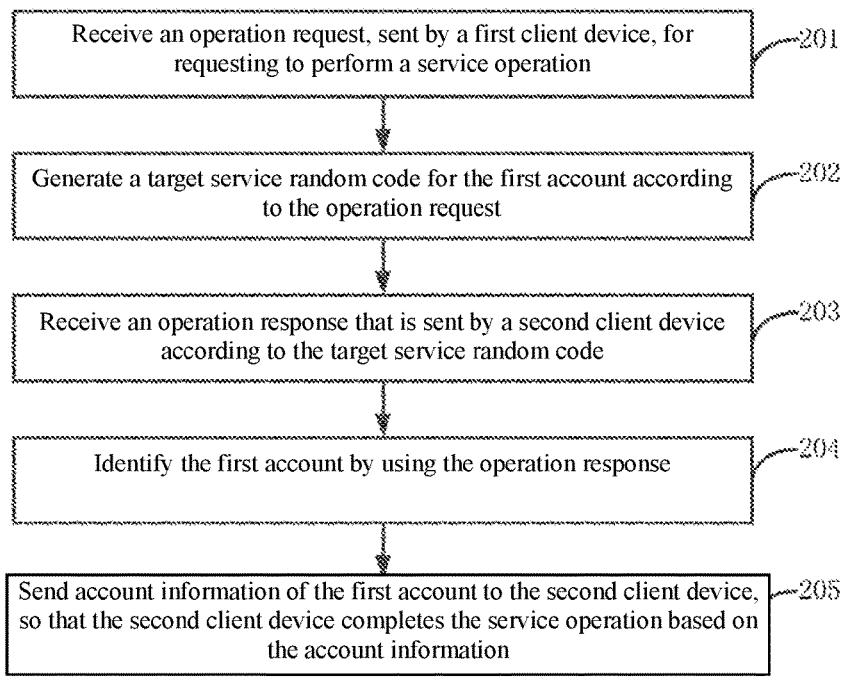
FIG. 2 is a flow chart of an embodiment of a service processing method according to the present application.

Referring to FIG. 2, FIG. 2 is a flow chart of an embodiment of a service processing method according to the present application. This embodiment is applied to a service server side, and includes the following steps:

Step 201: An operation request, sent by a first client device, for requesting to perform a service operation is received.

In the embodiments of the present application, after registering a first account with a service server, a first user may log onto the service server based on the first account, to complete various service operations. The first account may be information of the first user that can be uniquely identified by the service server, and may include a user name of the first user, for example, the first account is "user1@ABC.com"; the service operation mainly refers to various application functions provided by the service server for users, such as a payment function, provided by a third-party payment server to a user, for performing an online payment operation on selected goods, or a downloading function, provided by an instant messaging server to a user, for performing a downloading operation on a multimedia file in network storage space.

In this embodiment, when the first user needs to perform a service operation with a second user, the first user may send an operation request of the service operation to the service server by using the first client device, for example, the operation request may be triggered by using a service operation request option button set on an application interface of the first client device, or may be triggered by performing a specific-pose operation (for example, Shake) on the first client device, and this is not limited in the embodiment of the present application.

The operation request may include the first account and first geographic location information of the first client device, and the first geographic location information may specifically refer to coordinates of the first client device in a three-dimensional space. The first client device may obtain the first geographic location information thereof by using an existing geographic location determination technology. For example, when the first client device is a mobile phone, the first client device may obtain the first geographic location information by means of the Global Positioning System (GPS), or obtain the first geographic location information by means of base station distance measurement of a mobile operator network, or obtain the first geographic location information by means of Assisted GPS (A-GPS) in which the base station distance measurement and the GPS are combined to perform joint positioning; details are not repeated in the embodiment of the present application.

Step 202: A target service random code is generated for the first account according to the operation request.

In this embodiment, because various service operations may be performed simultaneously between different accounts that log onto the service server, a binding relationship list may be preset on the service server, and by using the binding relationship list, binding relationships among accounts of all users that have already logged onto the service server, geographic location information of client devices of the users, and service random codes generated for the accounts are saved, to dynamically maintain various types of user information in the service operation process.

After receiving the operation request sent by the first client device, the service server may first acquire the first geographic location information of the first client device from the operation request, and determine a first geographic range according to the first geographic location information. Using implementation of a near field service as an example, when the first geographic location information is coordinates of the first client device, a one-kilometer range with the coordinates as a center may be set as the first geographic range. Then the service server may acquire a first service random code set according to the maintained binding relationship list, where the first service random code set includes service random codes that are generated by the service server for the accounts that have already logged onto the service server in the first geographic range. Finally, the service server may generate, for the first account by using a random number generation algorithm, a target service random code different from the service random codes included in the first service random code set, where the random number generation algorithm may employ any existing algorithm, which is not limited in the embodiment of the present application. The target service random code may consist of preset bit information, and the information may be digits, letters, or a combination thereof. In this embodiment, to make it easy for a user to enter the target service random code so as to improve the real-time performance of the service operation, relatively short information bits may be set for the target service random code, for example, the service random code consists of four digits.

Further, after the target service random code is generated for the first account, a binding relationship among the first account, the first geographic location information, and the target service random code may be saved in the binding relationship list.

Step 203: An operation response that is sent by a second client device according to the target service random code is received.

After the service server generates the target service random code, the second user may learn the target service random code in different manners, and enter the target service random code to a service operation application interface of the second client, to trigger the second client device to send, to the service server, an operation response to the service operation.

In an optional implementation of learning the target service random code by the second user: assuming that the first client device and the second client device are located in a near field range, the service server may send the target service random code to the first client device, and the first client device presents the target service random code in a service operation application interface; in this case, the second user holding the second client device can view the target service random code from the service operation application interface of the first client device, and enter the target service random code on a service operation application interface of the second client device. In another optional implementation of learning the target service random code by the second user: the service server may also directly send the target service random code to the second client device, so that the second user enters the target service random code on the service operation application interface of the second client device. For ease of description in the subsequent embodiments, and to be distinguished from the target service random code originally generated by the server, in the embodiment of the present application, the service random code entered by the second user may be referred to as a check service random code.

In this embodiment, the operation response sent by the second client device may include the second account, second geographic location information of the second client device, and the check service random code entered by the second user according to the target service random code. The implementation of acquiring the second geographic location information by the second client device is identical to the foregoing implementation of acquiring the first geographic location information by the first client device, and details are not described herein again.

Step 204: The first account is identified by using the operation response.

In an optional implementation of this step, after receiving the operation response sent by the second client device, the service server may first acquire the second geographic location information and the check service random code from the operation response, and determine whether the second geographic location information belongs to the first geographic range. Because the first client device and the second client device are located in the near field range, when it is determined that the second geographic location information of the second client device belongs to the first geographic range, the check service random code may be matched with the service random codes in the first service random code set, and when obtaining the target service random code by means of matching from the first service random code set according to the check service random code, the service server may obtain the first account corresponding to the target service random code according to the binding relationship list, thereby completing identification of the first account.

In another optional implementation of this step, after receiving the operation response sent by the second client device, the service server may first acquire the second geographic location information and the check service random code from the operation response, and determine a second geographic range according to the second geographic location information. Still using implementation of a near field service as an example, when the second geographic location information is coordinates of the second client device, a one-kilometer range with the coordinates as a center may be set as the second geographic range; because the first client device and the second client device are located in the near field range, the determined second geographic range has a relatively large intersection range with the foregoing first geographic range, and generally, it can be ensured that the first client device is located in the second geographic range. Then, the service server may acquire a second service random code set according to the maintained binding relationship list, where the second service random code set includes service random codes that are generated by the service server for accounts that have already logged onto the service server in the second geographic range. Finally, the service server matches the check service random code with the service random codes in the second service random code set, and when obtaining the target service random code by means of matching from the second service random code set according to the check service random code, the service server may obtain, from the binding relationship list, the first account corresponding to the target service random code.

Step 205: Account information of the first account is sent to the second client device, so that the second client device completes the service operation based on the account information.

After the service server identifies the first account from the operation response, the service server thus learns that an account currently needing to perform a service operation with the second account is the first account, and in this case, the service server may send the account information of the first account to the second client device, where the account information may include an account name corresponding to the first account, type information of the first account and the like. After receiving the account information of the first account, the second client device may present the account information in the service operation application interface. After determining, according to the account information, that the first user is the user who needs to perform a service operation with the second user, the second user may enter corresponding service information in the service operation application interface, to complete the current service operation.

As shown in FIG. 1, because the service server can determine random codes in a near field distance range, when a distance between the first client device and the second client device is within a preset near field distance range, a near field service can be implemented between the first user and the second user. For example, the near field service may be a payment service that occurs in a shopping mall or occurs in a meeting place, or the like.

As can be seen from the above embodiment, a service processing process in this embodiment is completed based on a service random code that is generated by a service server in real time; therefore, security is relatively high, interference from the external natural environment is avoided, and reliability of service processing can be effectively improved.

Figure 3A:
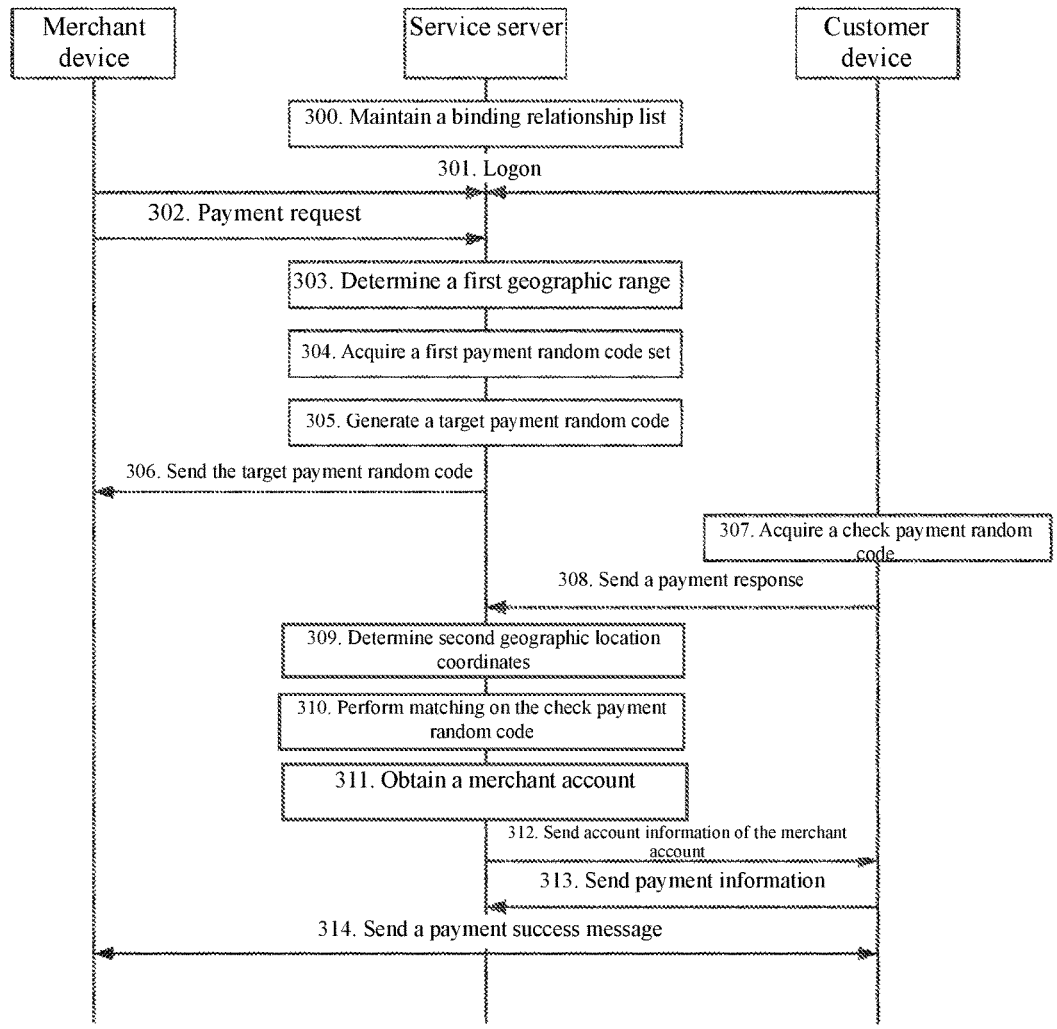
FIG. 3A is a flow chart of another embodiment of a service processing method according to the present application.

Referring to FIG. 3A, FIG. 3A is a flow chart of an embodiment of a service processing method according to the present application. This embodiment describes a payment service processing process in detail with reference to the application scenario shown in FIG. 1 and by using interaction between a service server and client devices, where a first client device and a second client device are client devices located in a same shopping mall and having a near field relationship, the first client device may be a merchant device held by a merchant in the shopping mall, and the second client device may be a customer device held by a customer buying goods in the shopping mall. This embodiment includes the following steps:

Step 300: A service server maintains a binding relationship list, where the binding relationship list saves binding relationships among merchant accounts of all merchants that have already logged onto the service server, geographic location information of merchant devices, and payment random codes generated for the merchant accounts.

In a scenario of implementing near field payment based on the service server, after any merchant logs onto the service server based on a merchant account by using a merchant device, the service server may save, in the binding relationship list, a binding relationship among the merchant account, geographic location information of the merchant device, and a payment random code generated for the merchant account.

Step 301: A merchant device and a customer device log onto a service server after enabling respective payment applications.

In this embodiment, in order to implement near field payment, the merchant and the customer may separately install a payment application (APP) on the merchant device and the customer device in advance, and after enabling the payment APP, log onto the service server by using account names and passwords used when registering with the service server.

Step 302: The merchant device sends, to the service server, a payment request for requesting the customer device to perform a payment operation, where the payment request includes a merchant account ID of the merchant device and first geographic location coordinates of the merchant device.

After selecting a goods of the merchant, the customer pays for the goods to the merchant by means of near field payment. In this embodiment, based on the payment APP enabled by the merchant device, the merchant may click a payment operation request option on an application interface of the payment APP, to trigger the merchant device to send a payment request to the service server, where the payment request may include a merchant account ID of the merchant device and first geographic location coordinates of the merchant device.

Figure 3B:
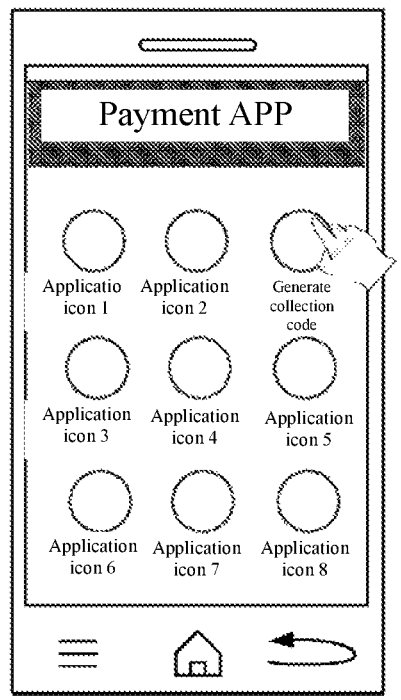
FIG. 3B is a schematic diagram of an application interface of a payment APP in the embodiment of FIG. 3A.

Referring to FIG. 3B, FIG. 3B is a schematic diagram of an application interface of the payment APP in this embodiment, where the "payment operation request option" may be specifically the application icon "generate collection code" shown in FIG. 3B, and after the merchant clicks the application icon, the merchant device may send a payment request to the service server, to request the service server to generate a target payment random code for the current payment operation, which may also be referred to as a target collection code in this embodiment.

Step 303: The service server determines a first geographic range by using the first geographic location coordinates of the merchant device as a center.

For example, after acquiring the first geographic location coordinates of the merchant device from the payment request, by using the first geographic location coordinates as a center, the service server may determine a range with a 1-kilometer diameter as the first geographic range.

Step 304: The service server acquires a first payment random code set according to the binding relationship list, where the first payment random code set includes payment random codes generated for merchant accounts that have already logged onto the service server in the first geographic range.

After determining the first geographic range, the service server may look up the binding relationship list, to separately compare geographic location coordinates in each binding relationship entry with the first geographic range, and obtain, according to the comparison result, payment random codes corresponding to geographic location coordinates belonging to the first geographic range, where the obtained payment random codes form the first payment random code set.

Step 305: The service server generates, for the merchant account, a target payment random code different from the payment random codes included in the first payment random code set.

In this embodiment, the service server generates different payment random codes for different merchant accounts in a same geographic range; therefore, after obtaining the first payment random code set, the service server may invoke a random number generation algorithm to generate a target payment random code for the merchant account of the current payment operation, where the target payment random code is different from the payment random codes included in the first payment random code set.

Step 306: The service server sends the target payment random code to the merchant device.

Figure 3C:
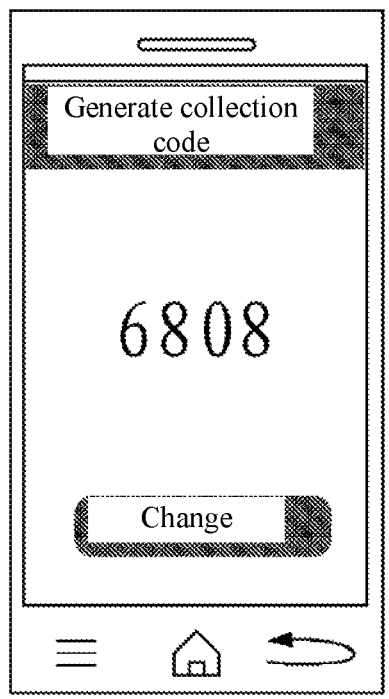
FIG. 3C is a schematic diagram of an application interface for displaying a target collection code on a merchant device in the embodiment of FIG. 3A.

After the service server sends the target payment random code to the merchant device, the merchant device may display the target payment random code on an application interface of the payment APP thereof. As shown in FIG. 3C, FIG. 3C is a schematic diagram of an application interface for displaying a target collection code on a merchant device, where the target collection code consists of four digits "6808" that are easy to recognize and enter.

Step 307: The customer device obtains a check payment random code entered by a customer according to the target payment random code.

In this embodiment, because the merchant and the customer are located in a near field range, and the customer is the object with which the merchant determines to perform the payment operation, the customer may view the target collection code from the application interface of the payment APP on the merchant device as shown in FIG. 3C, and enter the target collection code on the application interface of the payment APP on the customer device. In order to be distinguished from the originally generated target collection code, in this embodiment, the target collection code entered by the customer is referred to as a check collection code.

Step 308: The customer device sends, to the service server, a payment response to the current payment operation, where the payment response includes the check payment random code, a customer account ID of the customer device, and second geographic location coordinates of the customer device.

After the customer device obtains the check collection code entered by the customer, the customer device sends, to the service server, the payment response to the current payment operation, where the payment response includes the customer account ID of the customer device and the second geographic location coordinates of the customer device.

Step 309: The service server determines whether the second geographic location coordinates belongs to the first geographic range.

Step 310: When the second geographic location coordinates belong to the first geographic range, the service server matches the check payment random code with the payment random codes in the first payment random code set.

Step 311: When the target payment random code is obtained by means of matching, a merchant account corresponding to the target payment random code is obtained according to the binding relationship list.

Because the merchant device and the customer device are located in the near field range, the second geographic location coordinates of the customer device may generally fall within the first geographic range, and correspondingly, the target payment random code may be obtained by means of matching from the first payment random code set. Therefore, when the check payment random code in the payment response is a random code that is correctly entered by the customer according to the target payment random code, the target payment random code can be obtained by means of matching from the first payment random code set according to the check payment random code, and the merchant account corresponding to the target payment random code is acquired from the binding relationship list.

Step 312: The service server sends account information of the merchant account to the customer device.

After identifying the merchant account of the current service operation according to the check payment random code, the service server may send the account information of the merchant account to the customer device, so that the customer device displays the account information on the application interface of the payment APP. In this embodiment, the account information of the account may include a merchant name, a merchant type, and the like.

Step 313: After the customer performs the current payment operation on the customer device based on the account information of the merchant account, the customer device sends payment information to the service server.

After viewing the account information of the merchant account on the application interface of the customer device and determining that a merchant corresponding to the account information is the merchant of the current payment operation, the customer may enter a payment amount of the current payment operation in a corresponding input field of the application interface, and after the current payment operation is confirmed, the customer device sends payment information to the service server, for example, when the current payment operation is completed by means of transfer, the payment information may include information such as a transfer amount and a transfer account.

Figure 3D:
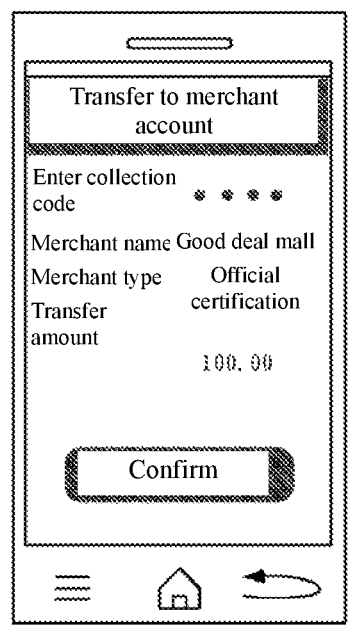
FIG. 3D is a schematic diagram of an application interface for transfer payment on a customer device in the embodiment of FIG. 3A.

As shown in FIG. 3D, FIG. 3D is a schematic diagram of an application interface for transfer payment on a customer device; with reference to FIG. 3C, in the field "enter collection code", the customer enters the target collection code "6808" that the customer views from the application interface of the merchant device, and after identifying the merchant account according to the collection code "6808", the service server sends the merchant name and merchant type of the merchant account to the customer device. As shown in FIG. 3D, "good deal mall" is displayed in the field "merchant name", and "official certification" is displayed in the field "merchant type"; after confirming that the above information is correct, the customer may enter a payment amount "100.00" in the field "transfer amount", and by clicking a "confirm" button, trigger the customer device to send the payment information of the current payment operation to the service server.

Step 314: After determining that the current payment operation is successful according to the payment information, the service server separately sends a payment success message to the merchant device and the customer device.

As can be seen from the above embodiment, this embodiment can complete a payment service between a merchant and a customer based on a payment random code that is generated by a service server in real time; therefore, security is relatively high, interference from the external natural environment is avoided, and reliability of payment service can be effectively improved.

Corresponding to the foregoing embodiment of the service processing method, the present application further provides an embodiment of a service processing apparatus.

Figure 4:
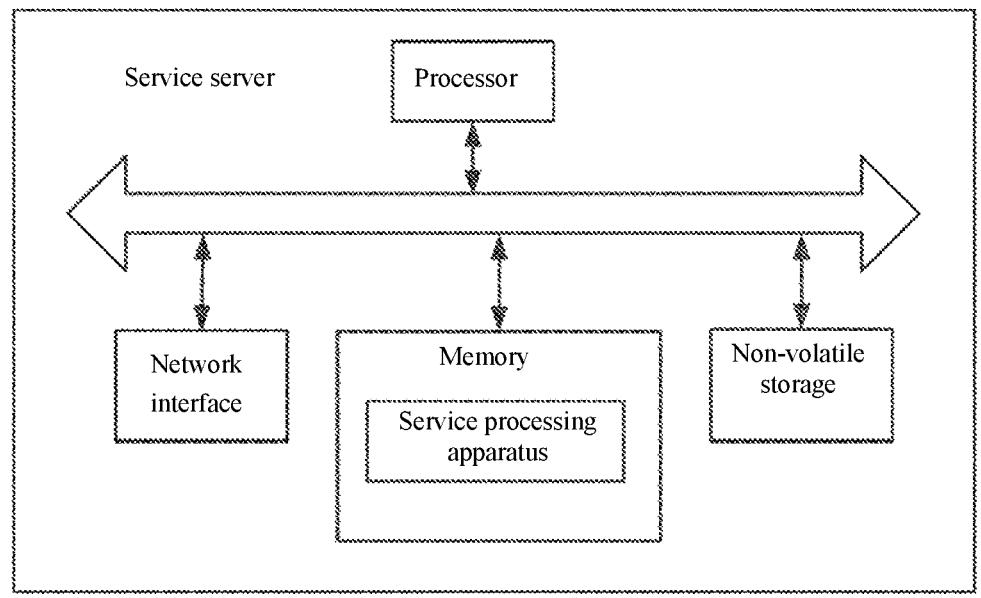
FIG. 4 is a hardware structural diagram of a service server where a service processing apparatus according to the present application is located.

The embodiment of the service processing apparatus according to the present application may be applied to a service server. The apparatus embodiment may be implemented by software, and may also be implemented by hardware or a combination of software and hardware. Using software implementation as an example, as a logical apparatus, the apparatus is formed by reading, by a processor of a service server where the apparatus is located, corresponding computer program instructions in a non-volatile storage into a memory for execution. From the perspective of a hardware level, as shown in FIG. 4, FIG. 4 is a hardware structural diagram of a service server where a service processing apparatus according to the present application is located. In addition to the processor, memory, network interface, and non-volatile storage shown in FIG. 4, generally, in the embodiment, the service server where the apparatus is located may further include other hardware according to actual functions of the server, and details are not described herein.

Figure 5:
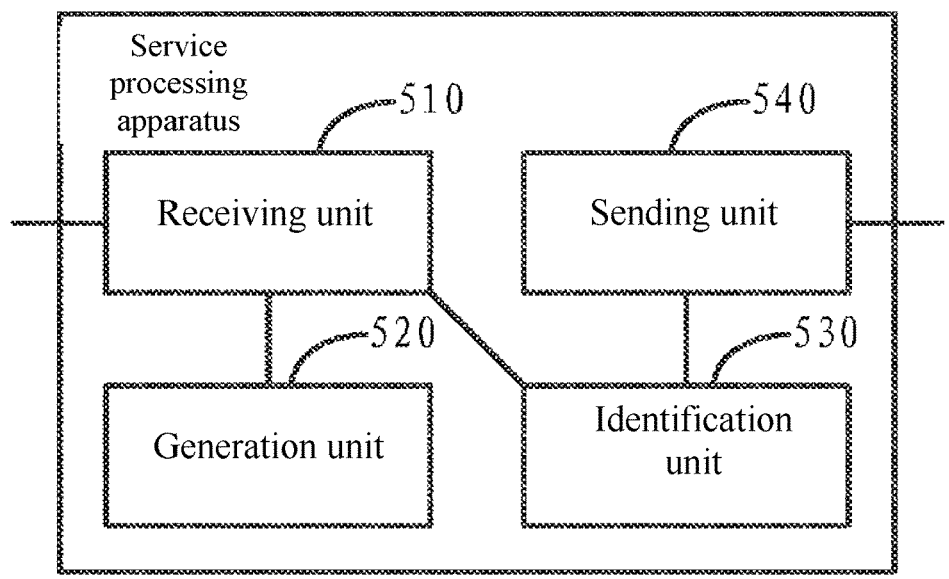
FIG. 5 is a block diagram of an embodiment of a service processing apparatus according to the present application.

Referring to FIG. 5, FIG. 5 is a block diagram of an embodiment of a service processing apparatus according to the present application, and the apparatus includes: a receiving unit 510, a generation unit 520, an identification unit 530, and a sending unit 540.

The receiving unit 510 is configured to receive an operation request, sent by a first client device, for requesting to perform a service operation, the first client device being a device with which a first user logs onto the service server based on a first account.

The generation unit 520 is configured to generate a target service random code for the first account according to the operation request.

The receiving unit 510 is further configured to receive an operation response that is sent by a second client device according to the target service random code, the second client device being a device with which a second user logs onto the service server based on a second account.

The identification unit 530 is configured to identify the first account by using the operation response.

The sending unit 540 is configured to send account information of the first account to the second client device, so that the second client device completes the service operation based on the account information.

In an optional implementation:
the sending unit 540 may be further configured to send the target service random code to the first client device, so that the second client device obtains the target service random code by means of the first client device; or send the target service random code to the second client device.

In another optional implementation:
the target service random code consists of preset bit information, and the information includes: digits, and/or letters.

Figure 6:
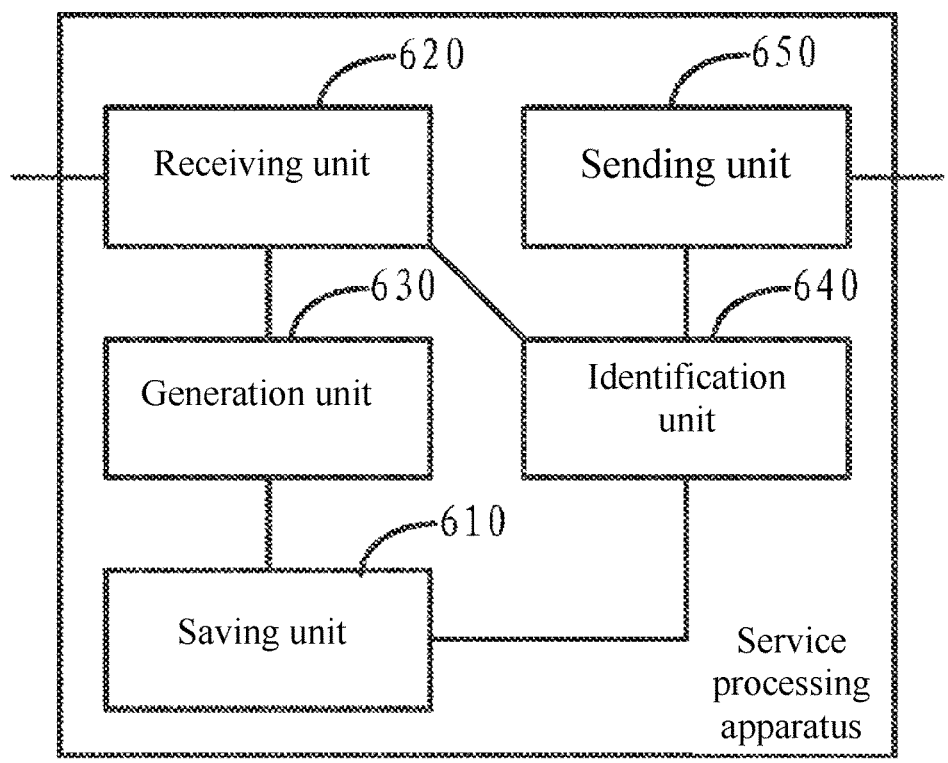
FIG. 6 is a block diagram of another embodiment of a service processing apparatus according to the present application.

Referring to FIG. 6, FIG. 6 is a block diagram of another embodiment of a service processing apparatus according to the present application, and the apparatus includes: a saving unit 610, a receiving unit 620, a generation unit 630, an identification unit 640, and a sending unit 650.

The saving unit 610 is configured to save, in a binding relationship list, a binding relationship among an account of a user who has already logged onto the service server, geographic location information of a client device of the user, and a service random code generated for the account.

The receiving unit 620 is configured to receive an operation request, sent by a first client device, for requesting to perform a service operation, where the first client device is a device with which a first user logs onto the service server based on a first account, and the operation request includes: first geographic location information of the first client device.

The generation unit 630 is configured to generate a target service random code for the first account according to the operation request.

The saving unit 610 is further configured to save, in the binding relationship list, a binding relationship among the first account, the first geographic location information, and the target service random code.

The receiving unit 620 is further configured to receive an operation response that is sent by a second client device according to the target service random code, where the second client device is a device with which a second user logs onto the service server based on a second account, and the operation response includes: second geographic location information of the second client device and a check service random code that is entered by the second user according to the target service random code.

The identification unit 640 is configured to identify the first account by using the operation response.

The sending unit 650 is configured to send account information of the first account to the second client device, so that the second client device completes the service operation based on the account information.

The generation unit 630 includes (not specifically shown in FIG. 6):

a first geographic range determining sub-unit configured to determine a first geographic range according to the first geographic location information;

a first random code set acquisition sub-unit configured to acquire a first service random code set according to the binding relationship list, where the first service random code set includes service random codes generated for accounts that have already logged onto the service server in the first geographic range; and a target random code generation sub-unit configured to generate, for the first account, a target service random code different from the service random codes included in the first service random code set.

The identification unit 640 may include (not shown in FIG. 6):

a second geographic location information determination sub-unit configured to determine whether the second geographic location information belongs to the first geographic range;

a check service random code matching sub-unit configured to match the check service random code with the service random codes in the first service random code set when the second geographic location information belongs to the first geographic range; and a first account acquisition sub-unit configured to obtain the first account corresponding to the target service random code according to the binding relationship list when the target service random code is obtained by means of matching from the first service random code set according to the check service random code.

In an optional implementation:

The first random code set acquisition sub-unit may be specifically configured to compare the geographic location information in the binding relationship list with the first geographic range; obtain, according to the comparison result, geographic location information belonging to the first geographic range, and form the first service random code set by using service random codes corresponding to the obtained geographic location information.

In another optional implementation:

The sending unit 650 may be further configured to send the target service random code to the first client device, so that the second client device obtains the target service random code by means of the first client device; or send the target service random code to the second client device.

In another optional implementation:

the target service random code consists of preset bit information, and the information includes: digits, and/or letters.

For details of an implementation process of the function and effect of each unit in the above apparatus, refer to the implementation process of the corresponding step in the method above, and details are not described herein again.

The apparatus embodiment basically corresponds to the method embodiment; therefore, for related parts, refer to partial description in the method embodiment. The apparatus embodiment described above is merely schematic, where the units described as separate components may or may not be physically separate, and the components displayed as units may or may not be physical units, that is, they may be located at a same place, or may also be distributed on multiple network units. Some or all of the modules may be selected according to an actual requirement, to achieve the objective of the solution of the present application. Those of ordinary skill in the art can understand and implement the present application without creative efforts.

As can be seen from the foregoing embodiment, in this embodiment, a service processing process is completed based on a service random code that is generated by a service server in real time; therefore, security is relatively high, interference from the external natural environment is avoided, and reliability of service processing can be effectively improved.

Those skilled in the art can easily think of other implementation solutions of the present application after considering the specification and practicing the invention disclosed herein. The present application is intended to cover any variations, usages, or adaptive changes of the present application, and these variations, usages or adaptive changes follow general principles of the present application and include common knowledge or conventional technical measures in the technical field that are not disclosed in the present application. The specification and embodiments are merely considered as exemplary, and the real scope and spirit of the present application are pointed out in the claims below.

It should be understood that, the present application is not limited to the precise structures that have been described above and illustrated in the accompanying drawings, and various modifications and changes can be made without departing from the scope thereof. The scope of the present application is only limited by the appended claims.

The invention claimed is:

1. A service processing method comprising:
   receiving an operation request, sent by a first client device, for requesting to perform a service operation, the first client device being a device with which a first user logs onto a service server based on a first account, the operation request comprising: first geographic location information of the first client device;
   determining a first geographic range according to the first geographic location information;
   acquiring a first service random code set according to a binding relationship list, wherein the binding relationship list includes one or more binding relationships with respect to one or more accounts that have logged onto the service server other than the first account, wherein each of the binding relationships is among one of the one or more accounts that have logged onto the service server, geographic location information of a client device corresponding to the one of the one or more accounts, and a service random code generated for the one of the one or more accounts, and wherein the first service random code set comprises service random codes generated for the one or more accounts that have logged onto the service server in the first geographic range;
   generating, for the first account, a target service random code different from the service random codes comprised in the first service random code set according to the operation request;
   saving, in the binding relationship list, a binding relationship among the first account, the first geographic location information, and the target service random code;
   receiving an operation response that is sent by a second client device according to the target service random code, the second client device being a device with which a second user logs onto the service server based on a second account, the operation response comprising: second geographic location information of the second client device, and a check service random code entered by the second user according to the target service random code;
   determining whether the second geographic location information belongs to the first geographic range;
   matching the check service random code with the service random codes in the first service random code set when the second geographic location information belongs to the first geographic range;
   obtaining the first account corresponding to the target service random code according to the binding relationship list when the target service random code is obtained by matching the check service random code with the service random codes in the first service random code set; and
   sending account information of the first account to the second client device, so that the second client device completes the service operation based on the account information.

2. The method according to claim 1, wherein the acquiring a first service random code set according to the binding relationship list comprises:
   comparing the geographic location information in the binding relationship list with the first geographic range; and
   obtaining, according to the comparison result, geographic location information belonging to the first geographic range, and forming the first service random code set by using service random codes corresponding to the obtained geographic location information.

3. The method according to claim 1, wherein after the generating a target service random code for the first account according to the operation request, the method further comprises: sending the target service random code to the first client device, so that the second client device obtains the target service random code; or sending the target service, random code to the second client device.

4. The method according to claim 1, wherein, the target service random code consists of preset bit information, and the preset bit information comprises: digits and/or letters.

5. A non-volatile memory that stores instructions, which, when executed by a processor, cause the processor to:
receive an operation request, sent by a first client device, for requesting to perform a service operation, the first client device being a device with which a first user logs onto a service server based on a first account, the operation request comprising: first geographic location information of the first client device;
determine a first geographic range according to the first geographic location information;
acquire a first service random code set according to a binding relationship list, wherein the binding relationship list includes one or more binding relationships with respect to one or more accounts that have logged onto the service server other than the first account, wherein each of the binding relationships is among one of the one or more accounts that have logged onto the service server, geographic location information of a client device corresponding to the one of the one or more accounts, and a service random code generated for the one of the one or more accounts, and wherein the first service random code set comprises service random codes generated for the one or more accounts that have logged onto the service server in the first geographic range;
generate, for the first account, a target service random code for different from the service random codes comprised in the first service random code set according to the operation request;
save, in the binding relationship list, a binding relationship among the first account, the first geographic location information, and the target service random code;
receive an operation response that is sent by a second client device according to the target service random code, the second client device being a device with which a second user logs onto the service server based on a second account, the operation response comprising: second geographic location information of the second client device, and a check service random code entered by the second user according to the target service random code;
determine whether the second geographic location information belongs to the first geographic range;
match the check service random code with the service random codes in the first service random code set when the second geographic location information belongs to the first geographic range;
obtain the first account corresponding to the target service random code according to the binding relationship list when the target service random code is obtained by matching the check service random code with the service random codes in the first service random code set; and send account information of the first account to the second client device, so that the second client device completes the service operation based on the account information.

6. The memory according to claim 5, wherein the instructions, when executed by the processor, cause the processor further to:
compare the geographic location information in the binding relationship list with the first geographic range;
obtain, according to the comparison result, geographic location information belonging to the first geographic range, and form the first service random code set by using service random codes corresponding to the obtained geographic location information.

7. The memory according to claim 5, wherein the instructions, when executed by the processor, cause the processor further to:
send the target service random code to the first client device, so that the second client device obtains the target service random code; or send the target service random code to the second client device.

8. The memory according to claim 5, wherein, the target service random code consists of preset bit information, and the preset bit information comprises: digits and/or letters.

9. A service server, comprising: a processor; and a memory that stores instructions, which, when executed by the processor, cause the processor to:
receive an operation request, sent by a first client device, for requesting to perform a service operation, the first client device being a device with which a first user logs onto the service server based on a first account, the operation request comprising: first geographic location information of the first client device;
determine a first geographic range according to the first geographic location information;
acquire a first service random code set according to a binding relationship list, wherein the binding relationship list includes one or more binding relationships with respect to one or more accounts that have logged onto the service server other than the first account, wherein each of the binding relationships is among one of the one or more accounts that have logged onto the service server, geographic location information of a client device corresponding to the one of the one or more accounts, and a service random code generated for the one of the one or more accounts, and wherein the first service random code set comprises service random codes generated for the one or more accounts that have logged onto the service server in the first geographic range;
generate, for the first account, a target service random code different from the service random codes comprised in the first service random code set according to the operation request;
save, in the binding relationship list, a binding relationship among the first account, the first geographic location information, and the target service random code;
receive an operation response that is sent by a second client device according to the target service random code, the second client device being a device with which a second user logs onto the service server based on a second account, the operation response comprising: second geographic location information of the second client device, and a check service random code entered by the second user according to the target service random code;

determine whether the second geographic location information belongs to the first geographic range;
match the check service random code with the service random codes in the first service random code set when the second geographic location information belongs to the first geographic range;
obtain the first account corresponding to the target service random code according to the binding relationship list when the target service random code is obtained by matching the check service random code with the service random codes in the first service random code set; and
send account information of the first account to the second client device, so that the second client device completes the service operation based on the account information.

10. The service server according to claim 9, wherein to acquire a first service random code set according to the binding relationship list, the instructions, when executed by the processor, cause the processor to:

compare the geographic location information in the binding relationship list with the first geographic range; and
obtain, according to the comparison result, geographic location information belonging to the first geographic range, and form the first service random code set by using service random codes corresponding to the obtained geographic location information.

11. The service server according to claim 9, wherein the instructions, when executed by the processor, cause the processor to:

send the target service random code to the first client device, so that the second client device obtains the target service random code; or send the target service random code to the second client device.

12. The service server according to claim 9, wherein the target service random code includes preset bit information, and the preset bit information comprises: digits and/or letters.

* * * * *